Patented June 15, 1943

2,321,690

UNITED STATES PATENT OFFICE 2,321,690

MANUFACTURE OF COMPOUNDS OF THE CYCLOPENTANO - POLYHYDROPHENAN - THRENE SERIES

Willy Logemann, Berlin-Charlottenburg, Germany, assignor to Schering Corporation, Bloomfield, N. J., a corporation of New Jersey No Drawing. Application June 21, 1938, Serial No. 214,957. In Germany July 7, 1937

19 Claims. (Cl. 260—397.3)

This invention relates to the manufacture of compounds of the cyclopentano-polyhydrophenanthrene series which contain on the carbon atom 17 a glyoxal residue.

As starting materials in this case there come into consideration such compounds of the cyclopentano-polyhydrophenanthrene series as exhibit on the carbon atom 17 a side chain in which a reactive methyl or methylene group is located in neighbouring position to a keto group which is preferably in position 20. These comprise for example saturated and unsaturated pregnanone-(20) compounds which can be further substituted in the molecule, for example in the 3-position by a keto group, hydroxy group or other groups which can be converted into the said groups.

Also all such compounds can be subjected to the process according to the invention as contain on the carbon atom 17 the group

—CO—CH$_2$R, in which R is hydrogen or any substituted or unsubstituted organic radical, as for example a hydrocarbon radical.

According to the present process these compounds are condensed in a suitable solvent with oxo compounds and in particular with aldehydes, as for example aliphatic or aromatic aldehydes such as nitrobenzaldehyde, salicylaldehyde, acetaldehyde and the like suitably with the addition of alkalies or alkaline reacting substances, as for example alcoholates such as sodium methylate or alkali cyanides, as is described for example in Houben-Weyl, Die Methoden der organischen Chemie, 1922, vol. 2, page 693 et seq. The compounds thus produced with the side chain

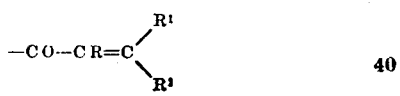

in which R, R$^1$ and R$^2$ have the above significance for R, are now treated with such oxidising agents as are capable of rupturing carbon-carbon double bonds, as for example ozone, chromic acid, tetraacetates such as lead or manganese tetra-acetate and the like.

Double bonds present in the ring system are suitably protected prior to the oxidation by attachment of such substituents as can be split off again with reformation of the double bond, as for example halogen, halogen hydride and the like, in order to prevent an attack by the oxidising agent also at these parts of the molecule which are liable to oxidation. It is likewise advantageous with the application of starting materials containing hydroxyl groups to protect these by conversion into groups which by hydrolysis can further be reconverted into the hydroxyl group, for example into the ether or ester group.

The splitting off of the groups attached to a double bond for reformation of the double bond takes place in known manner; thus for example bromine can be removed again from the compound by means of the process according to Finkelstein (Ber. 43 (1910) 1528) or in any other known manner.

The course of the reaction may be illustrated in the case of pregnenolone acetate:

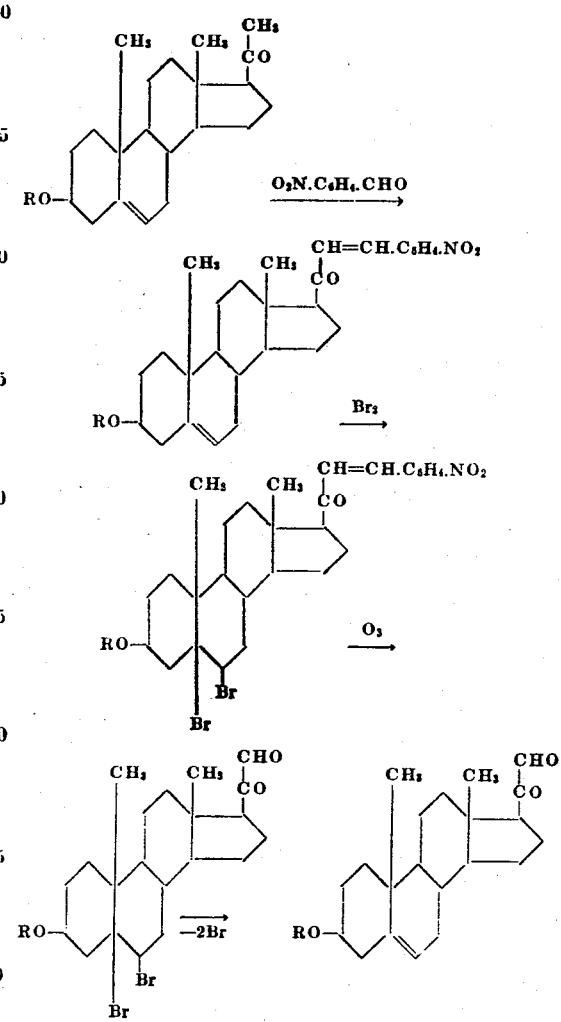

Having now particularly described and ascertained the nature of my said invention and in what manner the same is to be performed, I claim:

1. A process for the manufacture of an aetiocholyl-glyoxal comprising condensing a steroid compound having attached to the 17 carbon atom a side chain containing a reactive methylenic group with a compound containing a carbonyl group capable of reacting with a reactive methylenic group, and subjecting the resulting condensation product to an oxidation process.

2. A process for the manufacture of an aetiocholyl-glyoxal comprising condensing a steroid compound having attached to the 17 carbon atom the group —CO—CH₂R, wherein R is a member selected from the group consisting of hydrogen and hydrocarbon radicals, with a compound containing a carbonyl group capable of reacting with a reactive methylenic group and subjecting the resulting condensation product to an oxidation process.

3. A process for the manufacture of an aetiocholyl-glyoxal comprising condensing a steroid compound having attached to the 17 carbon atom the group —CO—CH₂R, wherein R is a hydrocarbon radical, with a compound containing a carbonyl group capable of reacting with a reactive methylenic group and subjecting the resulting condensation product to an oxidation process.

4. A process for the manufacture of an aetiocholyl-glyoxal comprising condensing a steroid compound selected from saturated and unsaturated pregnan-one-(20) compounds with a compound containing a carbonyl group capable of reacting with a reactive methylenic group and subjecting the resulting condensation product to an oxidation process.

5. A process as claimed in claim 1, in which as starting material pregnenolone-20-acetate-3 is employed.

6. A process as claimed in claim 1 in which an aldehyde is employed as the carbonyl containing compound.

7. A process as claimed in claim 1, in which an aromatic aldehyde is employed as the carbonyl containing compound.

8. A process for the manufacture of an aetiocholyl-glyoxal comprising condensing a steroid compound having attached to the 17 carbon atom a side chain containing a reactive methylenic group with a compound containing a carbonyl group capable of reacting with a reactive methylenic group, treating the resulting condensation product with a member of the group consisting of halogens and halogen hydrides and subjecting the so protected condensation product to an oxidation process.

9. A process as claimed in claim 1, in which with the application of starting materials containing hydroxyl groups these are protected by conversion into groups which can be reconverted by hydrolysis into the hydroxyl groups.

10. A process as claimed in claim 1, in which as oxidising agent ozone is employed.

11. A process for the manufacture of an aetiocholyl-glyoxal comprising condensing a steroid compound having attached to the 17 carbon atom a side chain containing a reactive methylenic group with a compound containing a carbonyl group capable of reacting with a reactive methylenic group in the presence of an alkaline condensing agent and subjecting the resulting condensation product to an oxidation process.

12. A process for the manufacture of an aetiocholyl-glyoxal comprising condensing a steroid compound having attached to the 17 carbon atom a side chain containing a reactive methylenic group with a compound containing a carbonyl group capable of reacting with a reactive methylenic group in the presence of an alkaline condensing agent selected from alcoholates and alkali cyanides and subjecting the resulting condensation product to an oxidation process.

13. A process for the manufacture of an aetiocholyl-glyoxal comprising condensing a steroid compound having attached to the 17 carbon atom a side chain containing a reactive methylenic group with a compound containing a carbonyl group capable of reacting with a reactive methylenic group in the presence of an alkaline reacting alcoholate and subjecting the resulting condensation product to an oxidation process.

14. Nuclearly saturated and unsaturated steroid compounds having the following structure

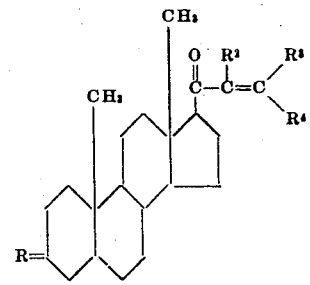

wherein $R^2$, $R^3$, and $R^4$ represent members selected from the group consisting of hydrogen and hydrocarbon radicals, and R represents a member selected from oxygen and

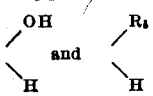

$R^5$ being a group convertible through a hydrolysis step into a hydroxyl group, the nuclear double bond in the case of the unsaturated steroid compounds being located between the 5-carbon atom and an adjacent carbon atom.

15. Nuclearly saturated aetio-cholyl-glyoxals of the formula

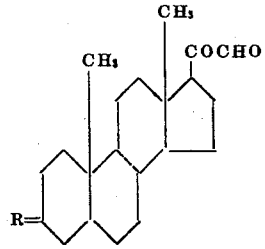

wherein R is a member of the class consisting of

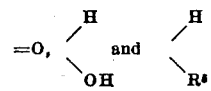

$R^5$ being a group convertible through a hydrolysis step into a hydroxyl group.

16. A process for the manufacture of aetiocholyl-glyoxal comprising condensing a steroid compound having attached to the 17-carbon atom a side chain containing a reactive methylenic group, with a compound containing a carbonyl group capable of reacting with a reactive methylenic group, treating the resulting condensation product with a substance capable of adding on to any nuclear unsaturated bonds and of being split off later to regenerate the unsaturated bonds, and subjecting the so protected condensation product to an oxidation process.

17. Process as claimed in claim 1, wherein a nitrobenzaldehyde is employed as the carbonyl-containing compound.

18. A process for the manufacture of an aetiocholyl-glyoxal comprising condensing a pregnenol-3-one-20 ester with a compound containing a carbonyl group capable of reacting with a reactive methylenic group, and subjecting the resulting condensation product to an oxidation process.

19. A process for the manufacture of an aetiocholyl-glyoxal comprising condensing a pregnenol-3-one-20 ester with a compound containing a carbonyl group capable of reacting with a reactive methylenic group, subjecting the resulting condensation product to an oxidation process and hydrolyzing the ester group from the 3-position.

WILLY LOGEMANN.